United States Patent
Holderer et al.

[11] Patent Number: 6,166,868
[45] Date of Patent: Dec. 26, 2000

[54] GALVANOPLASTIC OPTICAL MOUNTING

[75] Inventors: Hubert Holderer, Königsbronn; Ulrich Bingel, Lauterburg, both of Germany; Frits Zernike, Essex, Conn.

[73] Assignee: Carl-Zeiss-Stiftung, Germany

[21] Appl. No.: 09/126,934

[22] Filed: Jul. 30, 1998

[30] Foreign Application Priority Data

Aug. 18, 1997 [DE] Germany ............................ 197 35 831

[51] Int. Cl.⁷ ............................................. G02B 7/02
[52] U.S. Cl. ................................................ 359/819; 359/820
[58] Field of Search .................................. 359/819, 820, 359/822, 871

[56] References Cited

U.S. PATENT DOCUMENTS

| 5,058,993 | 10/1991 | Wakugawa | 359/896 |
| 5,162,951 | 11/1992 | Sorce | 359/871 |
| 5,383,168 | 1/1995 | O'Brian et al. | 359/44.14 |
| 5,570,238 | 10/1966 | Leary | 359/820 |
| 5,781,355 | 7/1998 | Meier | 359/871 |

FOREIGN PATENT DOCUMENTS

| 25 26 318 A1 | 12/1976 | Germany . |
| 204 320 | 11/1983 | Germany . |
| 11-153734 | 8/1999 | Japan . |

OTHER PUBLICATIONS

XP 002089448 Guse, Soviet Adjustment device for optical instruments has three platforms linked by leaf springs Oct. 6, 1985, p. 81.

*Primary Examiner*—Ricky Mack

[57] ABSTRACT

An optical mounting for an optical component includes an inner, preferably multi-part, portion that abuts the optical component and an outer frame, which are connected together by a plurality of spring hinge beams. The spring hinge beams and other portions of the optical mounting are produced galvanoplastically.

14 Claims, 2 Drawing Sheets

GALVANOPLASTIC OPTICAL MOUNTING

BACKGROUND OF THE INVENTION

1. Field of the Invention

The present invention relates to an optical mounting for an optical component and more particularly to a high-precision optical mounting.

2. Discussion of Relevant Prior Art

Particularly high requirements are placed on optical mountings for satellite-borne systems. Low weight and high mechanical and thermal loading are required, with precise, stress-free mounting of the optical components. Examples of known solutions in this field of use are given in German Patent DE 296 03 024.4 U, and the state of the art cited therein.

Another field with particularly high requirements is microlithography. The projection exposure systems require the closest tolerances and the smallest strains, even in the presence of thermal effects, in order to attain extremes of imaging quality.

Metallic mountings are usually used in both fields of application, and are produced by machining in the broadest sense, including erosion, water-stream cutting, grinding, laser ablation and the like. Spring hinges and beams are then used in many variants as decoupling elements.

Galvanoplasty is a known technique for the production of thin-walled precision parts, even mirror optics, for example. Metal, usually aluminum or nickel or their alloys, is electrolytically deposited on a mold core that has been made electrically conductive with a thin layer. After the desired thickness has been reached, the galvanoplastic part is released from the mold core, using a difference in thermal expansion.

It is known from East German Patent DD 204 320 A to provide a lens with a positively fitting ring by galvanoplastic means, the ring being finish-turned for the centering of the lens and having surfaces by means of which the lens is received in a mounting. The closed ring, when thermally loaded, inevitably leads to stresses in the lens, due to the different thermal expansion.

SUMMARY OF THE INVENTION

The object of the invention is a high-precision mounting, which makes possible an optimum decoupling of the mounted optical component from stresses. A further object of the invention is to provide a favorable production process for the mounting.

These objects are attained with an optical mounting and a process having the following features:

An optical mounting for an optical component, comprising an inner portion abutting the optical component, an outer frame, and a plurality of galvanoplastically-produced spring hinge beams connecting together the inner portion and the outer frame.

A process for production of an optical mounting with spring hinge beams, includes placing a base for at least one portion of an optical mounting in an electrochemical apparatus and forming at least a portion of the optical mounting by galvanoplastic deposition.

The use of galvanoplasty makes it possible to produce a very delicate mounting with the greatest reproducible accuracy in few processing steps.

Electrochemical deposition is simultaneously used as a jointing technique for adhesive-free connection to the mounted optical part, and for integration of a solid part with a cross section that would be produced uneconomically by galvanoplasty.

BRIEF DESCRIPTION OF THE DRAWINGS

The invention will now be described in further detail with reference to the accompanying drawings, in which.

DETAILED DESCRIPTION OF PREFERRED EMBODIMENTS

Figure 1:
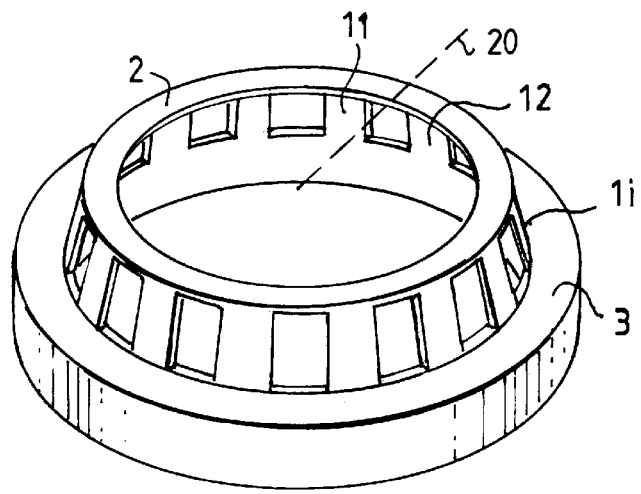
FIG. 1 shows a schematic overview of a galvanoplastic lens mounting.

FIG. 1 shows a galvanoplastic lens mounting in the state after release from a mold core (mandrel).

An outer ring 3 is solid and rigid, due to a sheathed core 30, and is preferably provided with auxiliary means (not shown here), such as bores or grooves, for fastening in the overall optical housing. Webs 11, 12, 1$i$ form thin spring beams that hold an inner ring 2 in its position centered with respect to the outer ring 3, but isolating from deformations of the outer ring, e.g., due to screwing to other parts, and likewise permitting, free from stress, deformations of the inner ring 2. Such deformations are brought about, for example, by the mounted optical component or by the connection thereto.

The webs 11, 12, 1$i$ likewise permit relative diameter changes of the inner ring 2 and the outer ring 3, such as may arise due to thermal expansion when the temperature changes. For this purpose, the inner ring 2 is divided between the webs 11, 12, 1$i$, preferably after its release from the mold core, in a reactionless process such as laser cutting.

The inner ring 2 is preferably galvanoplastically produced as a closed ring, since this substantially withstands removal from the mold core by thermal shrinking. The divided inner ring is then connected individually at each segment 2$n$ to the optical component (lens 7), and thus can take up its thermal expansion without stress. The segments 2$n$ can also be simple continuations of the spring hinge beams 1$n$.

Figure 2:
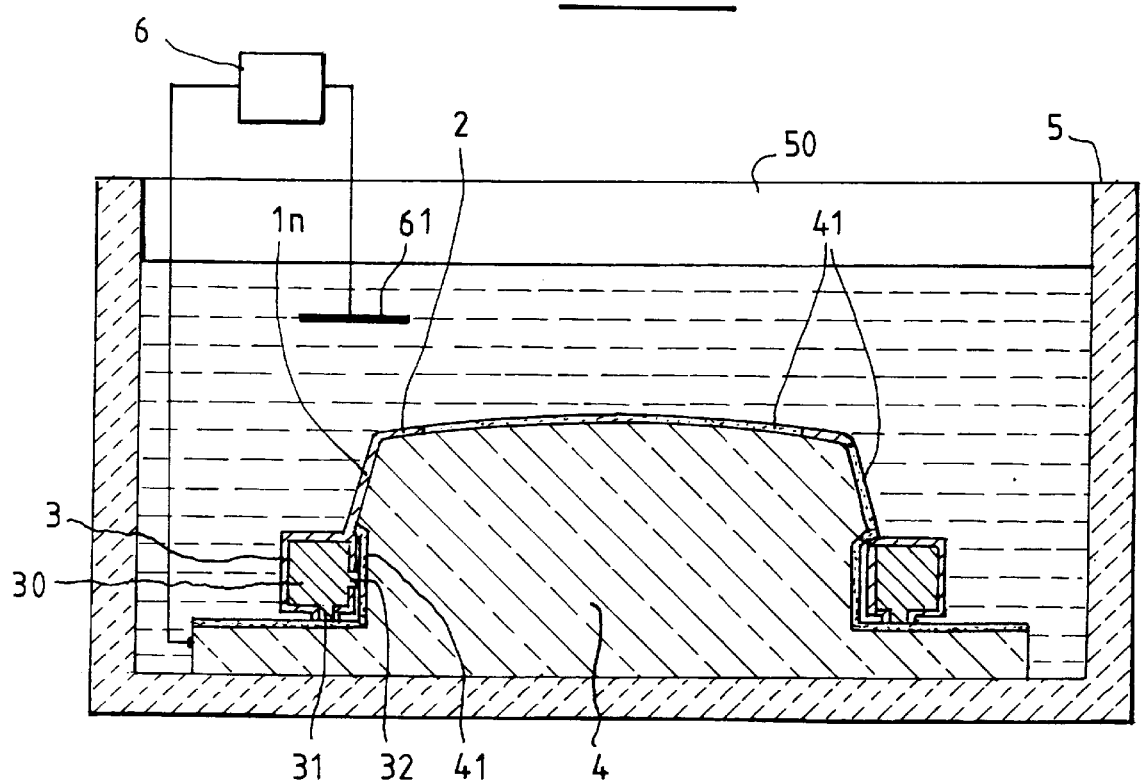
FIG. 2 shows a schematic cross section of a mounting on a mold core in an electroplating apparatus.

The thermal expansion of the outer ring 3 is determined by an integrated solid ring (30 in FIG. 2). The thermal expansion of the webs 11, 12, 1$i$ (spring hinge beams) is determined by the electrochemically deposited material. By a suitable geometry (length of the webs, and angle of inclination to the plane of the rings 2, 3), it can be insured, in the manner known from U.S. Pat. No. 5,162,951 (cited in the above-mentioned German Patent DE 296 03 024.4 U), that the spacing of the inner and outer rings does not vary, or else varies in a desired manner. The mounting (1, 2, 3) can be seen in FIG. 2, in section on a mold core 4 in the electroplating apparatus.

The mold core 4 can consist of glass, which is coated by a thin film technique, e.g., by vapor deposition, sputtering, PVD, CVD, with an electrically conductive thin layer in the shape of the mounting, either structured by a mask or produced by etching after the surfaces that are to remain have been covered with a mask, which may be photolithographically produced, for example.

A mold core 4 of metal, precision turned, ground and polished, is shown here. It is provided with an insulating layer 41 at the perforations of the mounting (1, 2, 3), and thus between the webs 11, 12, 1$i$, 1$n$, in a manner corresponding to the glass mold core described hereinabove.

It can be clearly seen in FIG. 2 how the solid core 30 of the outer ring 3 is sheathed by the electrochemically deposited layer and is connected to the webs 1n. A web is to be seen to the left, and a gap between two webs to the right. Adapters 31, 32, on the core 30 or on the mold core 4, secure the core 30 in its correct position during the electrolytic deposition.

The solid core is not only mechanically integrated into the mounting, but is also passivated, by the electrochemical sheathing.

The electrochemical apparatus is only schematically shown in FIG. 2, and has a trough 5, an electrochemical bath 50, a current source 6 with connections to the core 30 and to the conductive portion of the mold core 4, and also a counter-electrode 61.

A nickel layer of 120 µm thickness is thus deposited, for example, at 1 A/dm$^2$ in 10 hours.

Figure 3:
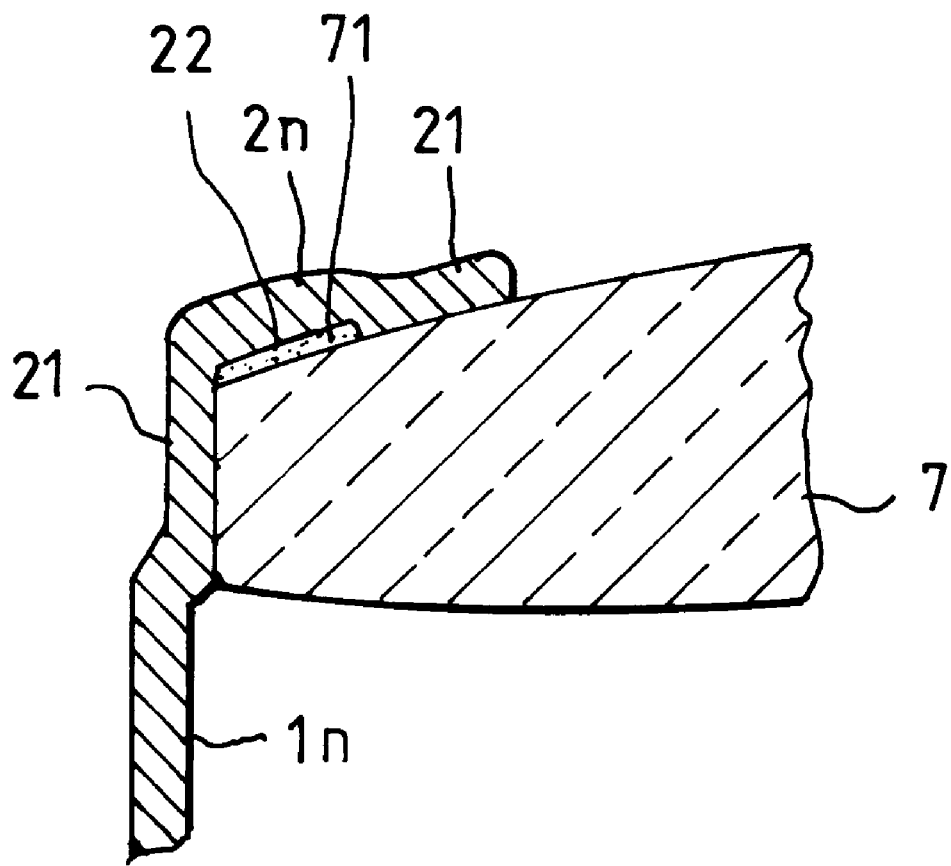
FIG. 3 shows in cross section a detail of the place of connection of the mounting and the lens.

FIG. 3 shows in section a spring hinge beam 1n with an associated segment 21 of the inner ring 2, with a lens 7 inserted into it. The mounting has locating surfaces 21 shaped by the mold core (mandrel) 4 in this region and mating exactly with the lens 7. A cavity 22 receives an adhesive 71 that holds the lens 7 and mounting together.

Optical parts other than lenses, such as prisms, polarization optical parts, diffractive elements or mirrors, even in shapes that are not rotationally symmetrical, can of course be mounted in this manner.

If it is desired to eliminate adhesive, the mounting can be directly combined electrochemically with the optical element. The mold core for the region of the spring hinge beams and of the outer ring can then no longer be released by thermal shrinking. The adhesion of the conductive layer to the mold core must be reduced by a parting agent. For example, a thin graphite layer can be applied to a metallic mold core.

The mountings can also be constructed with several spring hinge beam systems, e.g., a system according to FIG. 1, with a hexapod system arranged to follow it, and a further outer ring. Several parts which are completely or partially formed by galvanoplasty can be jointed together to form a mounting.

In an embodiment of FIG. 1, the core 30 of the outer ring has outer, inner, and thickness dimensions of 200 mm, 160 mm, and 20 mm respectively; the webs are 200 µm thick, 10 mm wide and 15 mm long, and their angle to the plane of the outer ring is about 10°. A lens of quartz glass with an outer diameter of 155 mm is mounted; the galvanoplastic material is nickel, and the core is steel. The position of the center of gravity of the lens is then displaced relative to the position of the seating surface of the outer ring 3 by less than 1 µm for a temperature change of +20° C. to +22° C.

What is claimed is:

1. An optical mounting for an optical component (7), comprising:
    an inner portion (2) abutting said optical component (7),
    an outer frame (3), and a plurality of galvanoplastically-produced spring hinge beams (11, 12, 1i) connecting together said inner portion (2) and said outer frame (3). wherein said optical component (7) bears a thin, electrically-conductive layer that is applied by thin-film technique, and said inner portion (2) is galvanoplastically applied to said conductive layer.

2. An optical mounting for an optical component, comprising:
    an inner portion abutting said optical component,
    an outer frame, and
    a plurality of galvanoplastic spring hinge beams connecting together said inner portion and said outer frame, wherein said outer frame includes a galvanically-coated solid part.

3. An optical mounting for an optical component, comprising:
    an inner portion abutting said optical component,
    an outer frame, and
    a plurality of galvanoplastic spring hinge beams connecting together said inner portion and said outer frame,
    wherein said galvanoplastic spring hinge beams decouple said optical component from stresses due to temperature changes.

4. An optical mounting according to claim 3, wherein said plurality of spring hinge beams permit relative diameter changes of said inner portion and said outer frame due to thermal expansion.

5. The optical mounting according to claim 3, wherein said optical component comprises a rotationally symmetrical lens connected to said inner portion outside an optically usable region of said optical component.

6. The optical mounting according to claim 3, wherein said inner portion comprises a galvanoplastic inner portion.

7. An optical mounting according to claim 6, wherein said inner portion is divided between said spring hinge beams.

8. An optical mounting according to claim 7, wherein said divided inner portion forms a plurality of segments individually connected to the optical component.

9. An optical mounting according to claim 8, wherein more than four segments are connected to the optical component.

10. The optical mounting according to claim 6, wherein said inner portion comprises a multipart inner portion.

11. The optical mounting according to claim 3, wherein said outer frame includes a galvanically-coated solid part.

12. An optical mounting according to claim 3, wherein the thickness of said spring hinge beams is less than 200 µm.

13. An optical mounting according to claim 3, wherein said outer frame is made of a first material and said galvanoplastic spring hinge beams are made of a second material, and wherein said first and second material are different.

14. An optical mounting according to claim 3, wherein the center of gravity of said optical component is displaced relative to the position of said outer frame by less than 1 µm for a temperature change of 20° to 22° C.

* * * * *